UNITED STATES PATENT OFFICE.

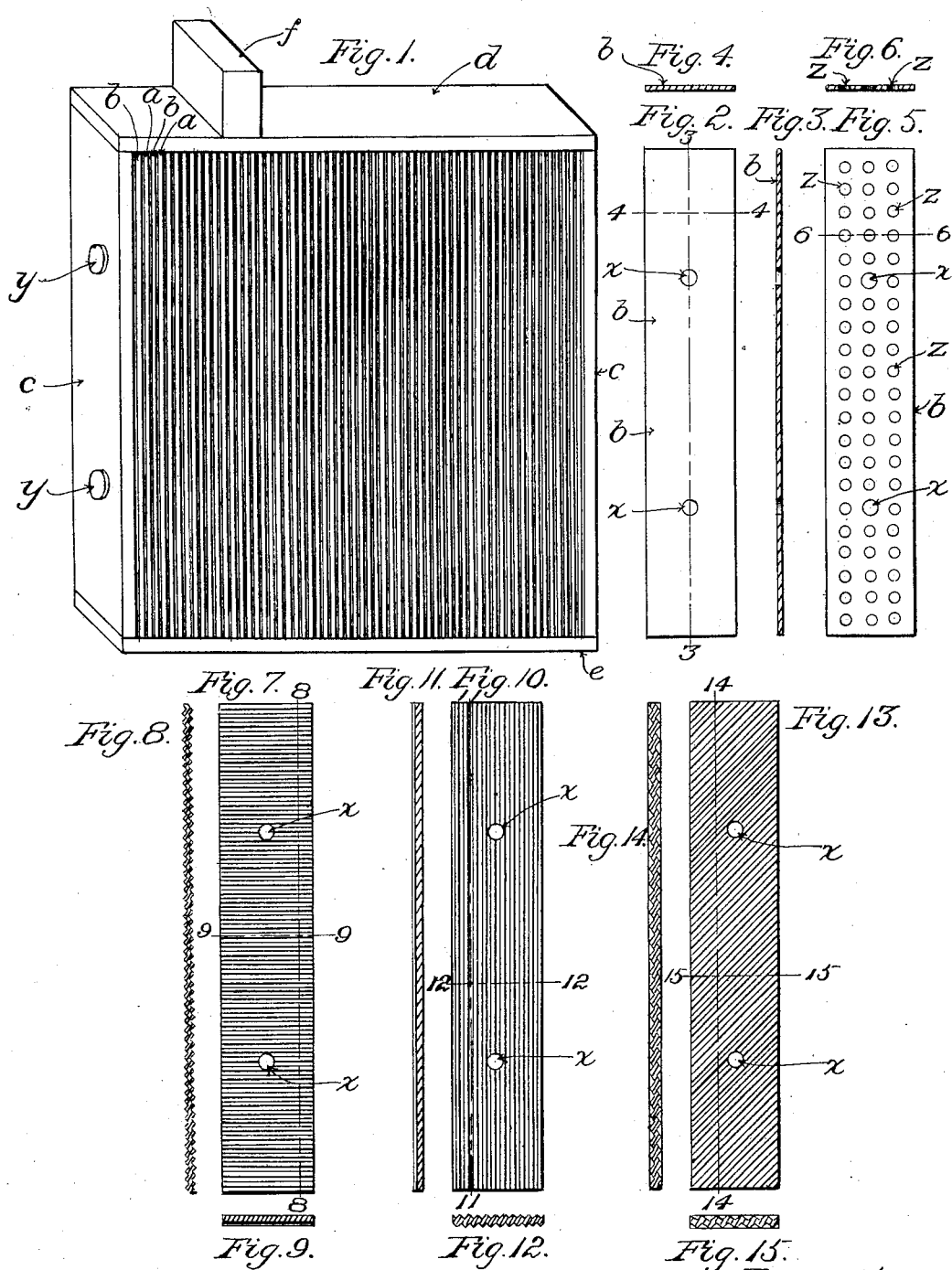

LEVI W. LOMBARD, OF BOSTON, MASSACHUSETTS, ASSIGNOR TO JEWELL STORAGE BATTERY COMPANY, OF PITTSFIELD, MASSACHUSETTS, A CORPORATION OF MAINE.

STORAGE BATTERY.

SPECIFICATION forming part of Letters Patent No. 700,210, dated May 20, 1902.

Application filed February 11, 1902. Serial No. 93,545. (No model.)

*To all whom it may concern:*

Be it known that I, LEVI W. LOMBARD, a citizen of the United States, residing at Boston, in the county of Suffolk, State of Massachusetts, have invented a certain new and useful Improvement in Storage Batteries, of which the following is a specification, reference being had therein to the accompanying drawings.

The objects of the invention are to produce a new and improved element for storage batteries, and more especially to produce an element having an exceedingly great extent of surface of active material and proportionate capacity and efficiency.

The invention consists, essentially, of an element which is composed of sheets or strips of an oxidizable metal alternated with sheets or strips of an unoxidizable or difficultly-oxidizable metal or alloy assembled closely together, the sheets or strips being all electrically joined together. I prefer to use pure lead for my oxidizable metal and for the other metal an alloy of lead and antimony or an alloy of lead, antimony, tin, and arsenic; but I do not restrict myself to the use of any particular metal or alloy, inasmuch as others may be substituted for those which are named. The sheets or strips may be of any suitable size, shape, or thickness and may be either plain, corrugated, unperforated, or perforated. Having built up the element by assembling and uniting the alternating series of sheets or strips, I subject the same to a treatment by which the oxidizable metal is changed into peroxid—*i. e.*, active material. As is known, pure lead will oxidize under electrolysis in an electrolyte of diluted sulfuric acid and will be changed thereby into peroxid of lead. The conversion into peroxid, it is known, also may be effected chemically by the use of such a solution without the aid of electrolytic action. Accordingly I subject the element to treatment—as, for example, with the solution referred to—either with or without the aid of electrolytic action, and thereby convert the alternate sheets or strips of oxidizable material into the required active material, (peroxid of lead.) The use of the alternate sheets or strips of unoxidizable or difficultly-oxidizable metal or alloy enables me to make an element of less weight and cost than the batteries now in use. At the same time said sheets or strips constitute good conductors of electricity and a permanent support for the intervening active material which is formed by the disintegration or conversion of the pure-lead sheets or strips into peroxid of lead, each of the layers of active material being supported at both sides thereof by the sheets of unoxidizable material or difficultly-oxidizable material which are in contact therewith.

In the accompanying drawings I have illustrated an embodiment of my invention and also various forms of strips.

In the drawings, Figure 1 shows in perspective an element embodying the invention. Fig. 2 shows in side elevation one of the strips which are employed in the production of the element shown in Fig. 1. Fig. 3 is a view of said strip in vertical section on the dotted line 3 3 of Fig. 2. Fig. 4 is a view of the said strip in horizontal section on the dotted line 4 4 of Fig. 2. Fig. 5 shows in elevation a perforated strip. Fig. 6 is a view thereof in horizontal section on the dotted line 6 6 of Fig. 5. Fig. 7 shows in elevation a strip having transverse corrugations. Fig. 8 is an edge view thereof. Fig. 9 is a view thereof in horizontal section on the dotted line 9 9 of Fig. 7. Fig. 10 shows in elevation a longitudinally-corrugated strip. Fig. 11 is a view thereof in longitudinal section. Fig. 12 is a view thereof in transverse section on the dotted line 12 12 of Fig. 10. Fig. 13 shows in elevation a diagonally-corrugated strip. Fig. 14 is a view thereof in longitudinal section on the dotted line 14 14 of Fig. 13. Fig. 15 shows the same in transverse section on the dotted line 15 15 of Fig. 13.

Having reference to the said drawings, and more particularly to Figs. 1 to 4 thereof, the strips of unoxidizable or difficultly-oxidizable metal or alloy are designated $a\,a\,a$, &c. The sheets or strips of oxidizable metal which alternate with the former are designated $b\,b\,b$, &c. At the opposite sides of the assemblage of alternating sheets or strips $ab\,ab\,ab$, &c., are placed thicker strips $c\,c$ of unoxidizable or difficultly-oxidizable material, and through holes $x\,x$ in the respective strips $a\,b\,c$ are passed rivets or bolts $y\,y$ of unoxidizable or difficultly-oxidizable material, which last may be the same as that of which strips $a\,a$ and $c\,c$ are composed, by means of which rivets or bolts the assemblage is clamped securely together. The sheets or strips are merely drawn into close contact with one another without being so firmly compressed as to prevent free access of the solution that is used for forming purposes and of the electrolyte that is employed during the regular use of the battery into the interior of the element. Comparatively thick sheets or strips $d\,e$, Fig. 1, of the unoxidizable metal are burned to the upper and lower ends of the assemblage of sheets or strips, and the upper sheet or strip $d$ is furnished with a lug $f$ for the attachment of an electrical conductor. Figs. 2, 3, and 4 show a plain and flat or unperforated strip for the purpose of facilitating the penetration of the electrolyte. The strips $a\,b$ may be perforated, as at $z\,z$, Figs. 5 and 6, or transversely corrugated, as in Figs. 7, 8, and 9, or longitudinally corrugated, as in Figs. 10, 11, and 12, or diagonally corrugated, as in Figs. 13, 14, and 15, or may be otherwise grooved or channeled, as deemed advisable. The corrugations of Figs. 7 to 15 have the advantage of increasing greatly the extent of surface in proportion to the size and thickness of the strips.

Special advantages of my improved element are the facts that by building the same up of alternating sheets or strips of oxidizable and unoxidizable or difficultly-oxidizable metal or alloy and subsequently converting the oxidizable metal into peroxid I am enabled to produce layers of the active material as thin as may be desired and perfectly uniform in thickness, and that the layers of active material are supported at opposite sides of each thereof by sheets or strips of unoxidizable or difficultly-oxidizable material in contact therewith.

I claim as my invention—

The improved element for storage batteries comprising a number of thin sheets or strips of metal assembled together and composed alternately of oxidizable and unoxidizable or difficultly-oxidizable sheets or strips all in contact with one another, the said oxidizable strips being adapted to be converted into active material by chemical or electrolytic treatment, and the strips of unoxidizable or difficultly-oxidizable metal holding between them the layers of active material and thereby supporting the same, substantially as described.

In testimony whereof I affix my signature in presence of two witnesses.

LEVI W. LOMBARD.

Witnesses:
NATHAN B. DAY,
ARTHUR F. RANDALL.